P. LOUIS.
Car Starter.

No. 136, 31,140.  Patented Jan. 15, 1861.

Inventor:
C. W. Cowtan
[signature]

Witnesses:
Peter Louis

UNITED STATES PATENT OFFICE.

PETER LOUIS, OF NEW YORK, N. Y., ASSIGNOR TO HIMSELF, AND HIRAM WANDEL, OF CASTLETON, NEW YORK.

STOPPING AND STARTING RAILROAD-CARS.

Specification of Letters Patent No. 31,140, dated January 15, 1861.

*To all whom it may concern:*

Be it known that I, PETER LOUIS, of the city, county, and State of New York, have invented a new and Improved Device for Stopping and Starting Railroad Cars; and I do hereby declare that the following is a full, clear, and exact description of the same, reference being had to the accompanying drawing, making a part of this specification, in which—

Figure 1:
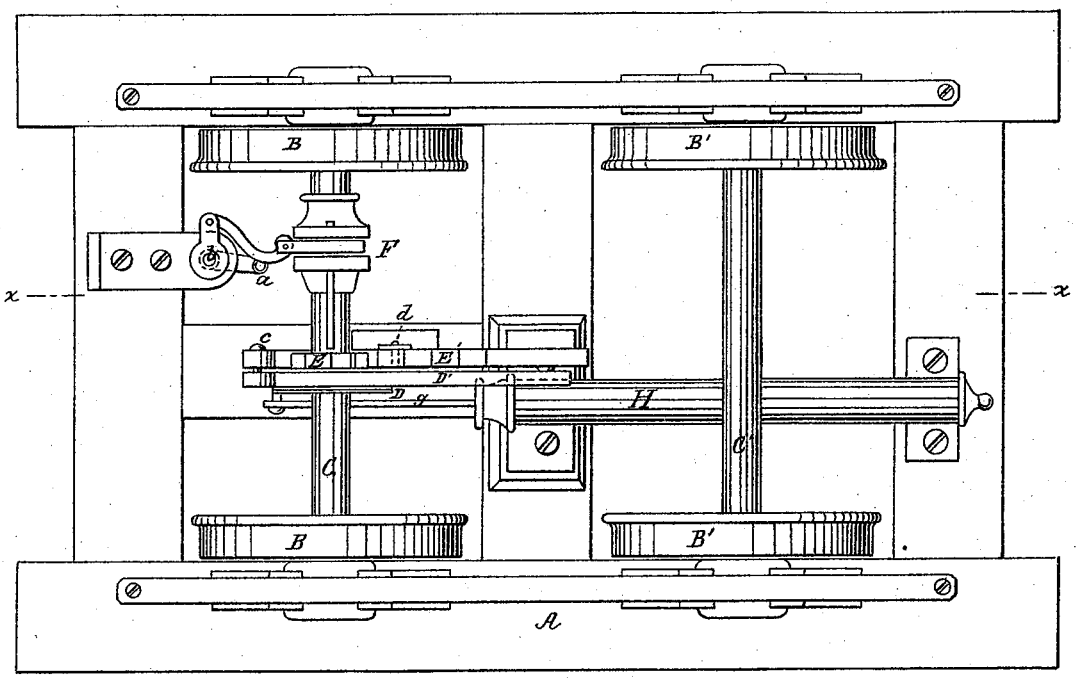
Figure 2:
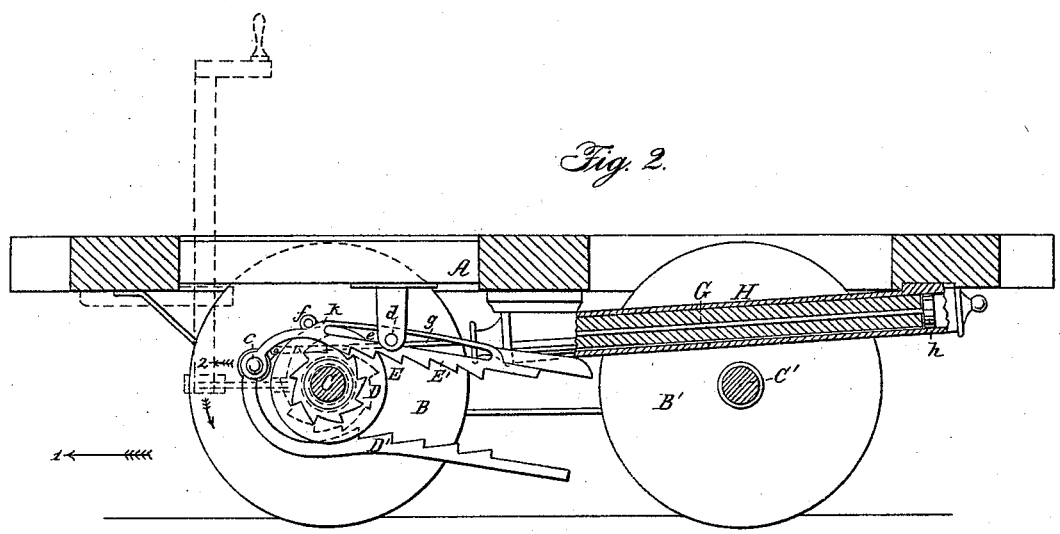

Figure 1 represents an inverted plan of this invention. Fig. 2, is a longitudinal vertical section of the same, the line $x$—$x$ Fig. 1 indicating the plan of section.

Similar leters in both figures refer to corresponding parts.

To enable those skilled in the art to make and use my invention I will proceed to describe its construction and operation with reference to the drawing.

The truck A is supported by four wheels B, B′, which run on axles C, C′, in the usual manner. Firmly secured to the axle C is the ratchet wheel D and another ratchet wheel E of a smaller diameter turns loosely on said axle and a clutch F to which a longitudinally sliding motion is imparted by turning the handle $a$ on the upper end of the vertical arbor $b$, serves to lock this ratchet wheel on the axle whenever it is desired. The two ratchet wheels D, E are in line with two serrated bars or racks D′, E′, one of which is above and the other below the axle. These racks are united at one end by a pivot $c$, and their teeth as well as the teeth of the ratchet wheels point in opposite directions as clearly shown in Fig. 2 in the drawing. The rack E′ is guided by a pin $d$, and slot $e$, and it is in such a position that the teeth of the ratchet wheel E catch into its teeth; and the rack D′, which stands opposite the ratchet wheel D, is retained by a dog $f$ in such a position, that it clears the teeth of said ratchet wheel and that it does not interfere with the motion of the axle C, in either direction. The dog $f$, is formed by the inner end of the lower rack and it connects by a rod $g$, with a piston $h$, which acts against a spring G, that is inclosed in a case H, as clearly shown in Fig. 2. The case H is secured to the under side of the truck frame and I have shown an india rubber spring because it is less liable to become injured by corrosion, but a metallic spring might be used. The dog $f$ rests on the upper edge of the rack E, and if the spring G, exerts a strain on the same, it is forced against an inclined shoulder $h$ and the rack D′ is raised so that its teeth are in the proper position to gear in the ratchet wheel D.

The operation is as follows: If the car moves in the direction of arrow 1 (Fig. 2) the axle C, revolves in the direction of the arrow marked upon it in the same figure; and if now the loose ratchet wheel E, is rendered fast in the axle by means of the clutch F, the racks D′, E′, are carried out in the direction of arrow 2, by the action of the teeth of the ratchet wheel E, on the rack E′. By this operation a strain is exerted on the spring G, and the resistance offered by the same to the forward motion of the axle C, causes the car to stop. The strain which the spring now exerts on the dog $f$, throws the rack D′, in gear with the fast ratchet wheel D, and on releasing the ratchet wheel E, by shifting the clutch back to its original position the spring G, begins to recede and the ratchet wheel D, is turned by the action of the rack D′, in the direction of the arrow marked upon it in Fig. 2, thereby starting the car in a forward direction.

It is obvious that by enlarging the diameter of the ratchet wheel D, the effect of the spring in starting the car, being exerted on a larger lever, is increased, and in the same manner the action of the ratchet wheel E in straining the spring is facilitated by decreasing its diameter. Furthermore by attaching the same device to the axle of the wheels B′, in an opposite direction the car can be stopped and started when going in either direction.

Having thus fully described my invention what I claim as new and desire to secure by Letters Patent is:—

The combination of the pivoted slotted rack E′ and the pivoted rack D′ with each other and with the dog $f$ ratchet wheels D, E, axle C′ clutch F and spring G in the manner and for the purposes herein shown and described.

PETER LOUIS.

Witnesses:
C. W. COWTAN,
M. M. LIVINGSTON.